(12) United States Patent
Bae (10) Patent No.: US 11,923,522 B2
(45) Date of Patent: Mar. 5, 2024

(54) BATTERY PACK AND ELECTRONIC DEVICE HAVING THE SAME

(71) Applicant: SAMSUNG SDI CO., LTD., Yongin-si (KR)

(72) Inventor: Kwangsoo Bae, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 738 days.

(21) Appl. No.: 16/979,700

(22) PCT Filed: Apr. 2, 2019

(86) PCT No.: PCT/KR2019/003853
§ 371 (c)(1),
(2) Date: Sep. 10, 2020

(87) PCT Pub. No.: WO2019/203478
PCT Pub. Date: Oct. 24, 2019

(65) Prior Publication Data
US 2021/0050569 A1    Feb. 18, 2021

(30) Foreign Application Priority Data
Apr. 17, 2018 (KR) ........................ 10-2018-0044531

(51) Int. Cl.
*H01M 10/653* (2014.01)
*H01M 10/60* (2014.01)
(Continued)

(52) U.S. Cl.
CPC ......... *H01M 10/653* (2015.04); *H01M 10/60* (2015.04); *H01M 10/615* (2015.04);
(Continued)

(58) Field of Classification Search
CPC ........... H01M 10/6235; H01M 10/653; H01M 10/6554; H01M 50/213; H01M 50/247; H01M 10/60; H01M 10/65; H01M 10/615
(Continued)

(56) References Cited

U.S. PATENT DOCUMENTS 5,449,571 A  *  9/1995  Longardner ........ H01M 50/105
                                              429/177
6,455,186 B1    9/2002  Moores, Jr. et al.
(Continued)

FOREIGN PATENT DOCUMENTS

CN    101154719 A    4/2008
CN    102456908 A    5/2012
(Continued)

OTHER PUBLICATIONS

International Search Report dated Jul. 12, 2019 for PCT/KR2019/003853.
(Continued)

*Primary Examiner* — Edward Tso
*Assistant Examiner* — Aaron Piggush
(74) *Attorney, Agent, or Firm* — Lee IP Law, P.C.

(57) ABSTRACT

Provided are a battery pack configured to be easily charged even at a subzero temperature and an electronic device including the battery pack. The battery pack includes: a housing which includes a first surface including an opening and forms an exterior of the battery pack; a battery unit which is accommodated in the housing; and a heat transfer portion which is arranged on the first surface of the housing and is at least partially exposed to outside of the housing through the opening, the heat transfer portion increasing an inside temperature of the housing by receiving heat from the outside.

15 Claims, 7 Drawing Sheets

(51) Int. Cl.
  *H01M 10/615*  (2014.01)
  *H01M 10/6235* (2014.01)
  *H01M 10/65*   (2014.01)
  *H01M 10/6554* (2014.01)
  *H01M 50/213*  (2021.01)
  *H01M 50/247*  (2021.01)

(52) U.S. Cl.
  CPC ....... *H01M 10/6235* (2015.04); *H01M 10/65* (2015.04); *H01M 10/6554* (2015.04); *H01M 50/213* (2021.01); *H01M 50/247* (2021.01)

(58) Field of Classification Search
  USPC .......................... 320/112, 107, 134, 136, 150
  See application file for complete search history.

(56) References Cited

U.S. PATENT DOCUMENTS

| | | | |
|---|---|---|---|
| 7,692,408  | B2 | 4/2010  | Miyazaki et al. |
| 8,568,913  | B2 | 10/2013 | Yoon |
| 9,040,190  | B2 | 5/2015  | Kim et al. |
| 9,077,018  | B2 | 7/2015  | Adachi et al. |
| 9,385,405  | B2 | 7/2016  | Murata et al. |
| 9,603,288  | B2 | 3/2017  | Kwak et al. |
| 2009/0167253 | A1 | 7/2009 | Muraoka et al. |
| 2014/0154549 | A1* | 6/2014 | Wayne ................ H01M 10/613 |
| | | | 29/890.03 |
| 2014/0287281 | A1* | 9/2014 | Murata ............... H01M 50/204 |
| | | | 429/50 |
| 2015/0037646 | A1* | 2/2015 | Wyatt ................ H01M 10/058 |
| | | | 29/623.2 |
| 2017/0346089 | A1 | 11/2017 | Yamamoto et al. |

FOREIGN PATENT DOCUMENTS

| | | |
|---|---|---|
| JP | 1999-288744   A | 10/1999 |
| JP | 2001-095171   A | 4/2001 |
| JP |       3121123 U | 4/2006 |
| JP | 2006-278032   A | 10/2006 |
| JP | 2006-286508   A | 10/2006 |
| JP | 2007-330008   A | 12/2007 |
| JP | 2013-114759   A | 6/2013 |
| JP | 2014-089839   A | 5/2014 |
| JP | 2015-159115   A | 9/2015 |
| JP | 2015-198459   A | 11/2015 |
| KR | 10-1999-0055245 A | 7/1999 |
| KR |   20-0418030 Y1 | 6/2006 |
| KR | 10-2012-0102345 A | 9/2012 |
| KR | 10-2013-0119076 A | 10/2013 |
| KR |    10-1366507 B1 | 2/2014 |
| KR |    10-1618608 B1 | 5/2016 |
| KR |    10-1704359 B1 | 2/2017 |

OTHER PUBLICATIONS

Japanese Office action dated Oct. 25, 2021.
Korean Office action dated May 18, 2023.
Chinese Office Action dated Dec. 7, 2023, of the CN Patent Application No. 201980025969.5.

* cited by examiner

BATTERY PACK AND ELECTRONIC DEVICE HAVING THE SAME

CROSS REFERENCE TO RELATED APPLICATIONS

This is the U.S. national phase application based on PCT/KR2019/003853, filed Apr. 2, 2019, which is based on Korean Patent Application No. 10-2018-0044531 filed on Apr. 17, 2018, the entire contents of all of which are hereby incorporated by reference.

TECHNICAL FIELD

The present disclosure relates to a battery pack and an electronic device including the battery pack.

BACKGROUND ART

Along with the development of wireless Internet and communication techniques, the use of portable electronic devices that can be operated using batteries even when a power outlet is not available has become widespread. When provided with battery packs, such portable electronic devices may be used anywhere without being limited to places equipped with power outlets. In addition, as portable electronic devices are widely used in various fields, demand for battery packs has also markedly increased. Such battery packs can be used multiple times by recharging the battery packs, and thus the use thereof is recommended in terms of economical and environmental efficiency.

Such a battery pack may be charged in a state in which the battery pack is fixedly attached to or separated from an electronic device. Such a battery pack may be charged by connecting the battery pack to a charger directly connected to a power source. In addition, charging of battery packs should be guaranteed in any environments to use the battery packs as power sources of electronic devices. In other words, when an electronic device is used in an extreme outdoor environment such as a subzero-temperature environment instead of a room-temperature environment, it is difficult to charge a battery pack of the electronic device at an appropriate charge temperature, and thus, in this case, the battery pack may not be easily charged.

DESCRIPTION OF EMBODIMENTS

Technical Problem

The present disclosure is proposed to solve various problems including the above-described problems, and an objective of the present disclosure is to provide a battery pack configured to be easily charged even at a subzero temperature, and an electronic device including the battery pack. However, these problems are examples, and the scope of the present disclosure is not limited thereto.

Solution to Problem

According to an aspect of the present disclosure, a battery pack includes: a housing which includes a first surface including an opening and forms an exterior of the battery pack; a battery unit which is accommodated in the housing; and a heat transfer portion which is arranged on the first surface of the housing and is at least partially exposed to outside of the housing through the opening, the heat transfer portion increasing an inside temperature of the housing by receiving heat from the outside.

In an embodiment, the heat transfer portion may include a bent portion, a first extension portion on a side of the bent portion, and a second extension portion on another side of the bent portion, and the first extension portion may be exposed to the outside of the housing through the opening.

In an embodiment, the bent portion and the second extension portion may be located inside the housing.

In an embodiment, heat transferred to the first extension may be conducted through the bent portion and the second extension portion to increase the inside temperature of the housing.

In an embodiment, a surface area of the second extension portion may be greater than a surface area of the first extension portion.

In an embodiment, the heat transfer portion may include a metallic material.

In an embodiment, the heat transfer portion may include a nickel alloy or a copper alloy.

In an embodiment, the heat transfer portion may be inserted into the housing by an insert injection molding method.

According to another aspect of the present disclosure, an electronic device includes: a battery pack which includes a housing having a first surface and forming an exterior of the battery pack, a battery unit accommodated in the housing, and a heat transfer portion arranged on the first surface of the housing and at least partially exposed to outside of the housing; and a charging unit which is configured to charge the battery pack by receiving power from outside of the charging unit, the charging unit including a second surface which faces the first surface of the housing and a heat supply portion which is arranged on the second surface and is at least partially exposed to the outside of the charging unit.

In an embodiment, the heat supply portion may be configured to be in direct contact with the heat transfer portion.

In an embodiment, heat supplied from the heat supply portion may be transferred to the heat transfer portion to increase an inside temperature of the housing.

In an embodiment, the heat transfer portion may include a bent portion, a first extension portion on a side of the bent portion, and a second extension portion on another side of the bent portion.

In an embodiment, the first extension portion may be exposed to the outside of the housing.

In an embodiment, the first extension portion may be configured to be in direct contact with the heat transfer portion.

In an embodiment, the second extension portion and the bent portion may be located inside the housing.

In an embodiment, a surface area of the second extension portion may be greater than a surface area of the first extension portion.

In an embodiment, the heat transfer portion may include a metallic material.

In an embodiment, the heat transfer portion may include a nickel alloy or a copper alloy.

In an embodiment, the heat transfer portion may be inserted into the housing by an insert injection molding method.

Advantageous Effects of Disclosure

As described above, according to the one or more of the above embodiments of the present disclosure, the battery pack may be easily charged even at a subzero temperature, and the electronic device includes the battery pack. However, the scope of the present disclosure is not limited to these effects.

In addition to the above-described effect, other effects of the present disclosure may be understood from the following description with reference to the accompanying drawings.

MODE OF DISCLOSURE

The present disclosure may be variously modified and may have various embodiments, and specific embodiments will now be illustrated in the accompanying drawings and described in detail. Effects and features of the present disclosure, and implementation methods thereof will be clarified through the following embodiments described in detail with reference to the accompanying drawings. However, the scope and idea of the present disclosure are not limited to the following embodiments but may be implemented in various forms.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

In the following embodiments, terms such as first and second are not used in a limiting sense, but are used for the purpose of distinguishing one element from other elements.

In the following embodiments, the terms of a singular form may include plural forms unless referred to the contrary.

In addition, terms such as "include" or "comprise" specify features or the presence of stated elements, but do not exclude one or more other features or elements.

In the following embodiments, it will be understood that when a film, a region, or an element is referred to as being "above" or "on" another film, region, or element, it can be directly on the other film, region, or element, or intervening films, regions, or elements may also be present.

In the following embodiments, X, Y, and Z axes are not limited to the definition of the Cartesian coordinate system but may be differently defined or construed. For example, the X-axis, the Y-axis, and the Z-axis may be perpendicular to one another, or may represent different directions that are not perpendicular to one another.

In the drawings, the sizes of elements may be exaggerated or reduced for ease of description. For example, in the drawings, the size or thickness of each element may be arbitrarily shown for illustrative purposes, and thus the present disclosure should not be construed as being limited thereto.

Figure 1:
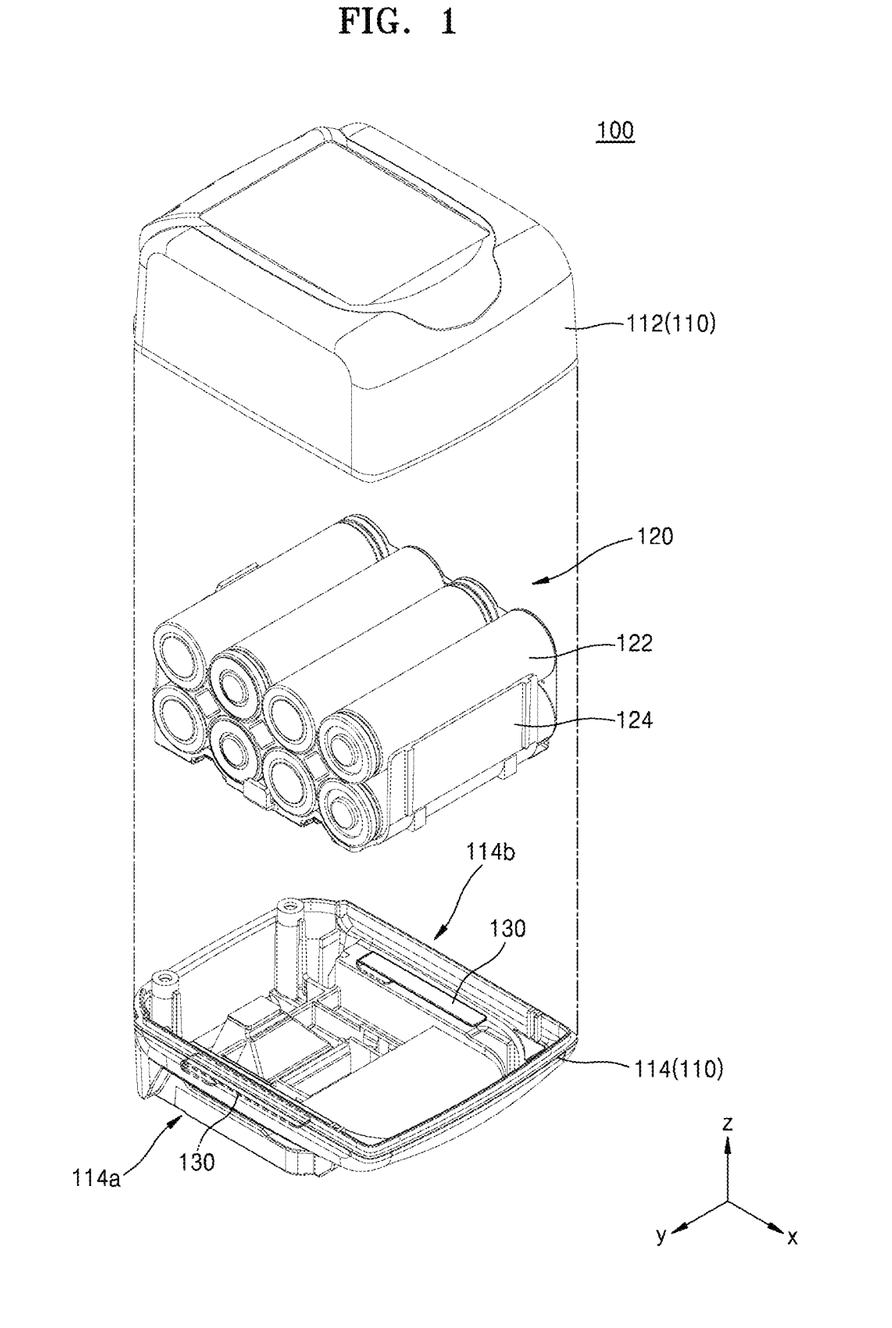
FIG. 1 is an exploded perspective view schematically illustrating a battery pack according to an embodiment of the present disclosure.

Referring to FIG. 1, a housing 110 forms the exterior, a battery unit 120 is accommodated in the housing 110, and heat transfer portions 130 are located on a side of the housing in a state in which at least a portion of each of the heat transfer portions 130 is exposed to the outside.

The housing 110 may have a space therein and may accommodate the battery unit 120. The housing 110 may be formed of an insulating material such as a plastic material. In addition to the battery unit 120, a circuit unit for operating a battery pack 100 may be further provided in the housing 110.

The housing 110 may include an upper housing 112 and a lower housing 114. As the upper housing 112 and the lower housing 114 are coupled to each other, the battery pack 100 may be accommodated therein. The lower housing 114 may include a coupling portion (not shown) and an external terminal (not shown) for being coupled with a charger or an electric tool to be described later. In the present embodiment, the lower housing 114 includes the heat transfer portions 130 which are at least partially exposed to the outside. The heat transfer portions 130 will be described later in detail with reference to FIGS. 2 and 3.

The battery unit 120 is a member that generates electrochemical energy through the movement of ions or electrons. The battery unit 120 may include at least one bare cell 122. A plurality of bare cells 122 may be accommodated in a holder 124 inside the housing 100. Each of the bare cells 122 may be manufactured by winding or stacking a positive electrode plate, a negative electrode plate, and a separator therebetween to form an electrode assembly, and accommodating the electrode assembly in a battery case together with an electrolyte solution. The electrode assembly generates energy while electrochemically react with the electrolyte, and the energy is supplied to an external device through an electrode tab or the like. For example, the battery case may be a pouch-shaped, prismatic, or cylindrical battery case. The battery unit 120 may include a protective circuit module electrically connected to the bare cells 122 to control the voltage or current of the bare cells 122 while the bare cells 122 are charged and discharged. The protective circuit module may be implemented as a circuit board on which a circuit pattern is formed, and various electronic components may be mounted on a surface of the protective circuit module to control the electrode assemblies of the bare cells 122 or to break a circuit in case of a malfunction of the electrode assemblies.

The heat transfer portions 130 may be located on a side of the housing 110. In the present embodiment, the heat transfer portions 130 are illustrated as being arranged on the lower housing 114, but the heat transfer portions 130 may be arranged on the upper housing 112 according to the charging direction of the battery pack 100. In addition, the heat transfer portions 130 may be arranged on one side 114a and the other side 114b of the lower housing 114, respectively. The positions and number of heat transfer portions 130 may be modified according to the positions and number of heat sources (described later).

The heat transfer portions 130 may be formed of a material having electrical conductivity and thermal conductivity, such as a metallic material, and may preferably include a nickel alloy or a copper alloy having high thermal conductivity. The heat transfer portions 130 are provided to increase the temperature of the internal air of the housing 110, and are thus not in contact with but are separate from the battery unit 120, the circuit unit for driving the battery unit 120, or the like.

When the battery pack 100 is designed for power tools of the related art, due to the characteristics of the power tools which are usually used outdoor, it is important to design the battery pack 100 to withstand a temperature difference from the outside. In particular, when the battery pack 100, which are used while being repeatedly charged and discharged, is charged using a charger at a subzero temperature, the battery pack 100 may not be easily charged because the temperature of the battery pack 100 is low due to the outside temperature. In this situation, a user of a power tool may place the battery pack 100 beside a fire such as a stove to increase the temperature of the battery pack 100, but this may excessively increase the temperature of the battery pack 100 sensitive to high temperatures and may thus cause explosion of the battery pack 100 or damage to the battery pack 100.

Therefore, according to an embodiment of the present disclosure, the battery pack 100 is provided with the heat transfer portions 130 which are at least partially exposed on the housing 110, and thus the battery pack 100 may be easily charged regardless of the outside temperature.

Figure 2:
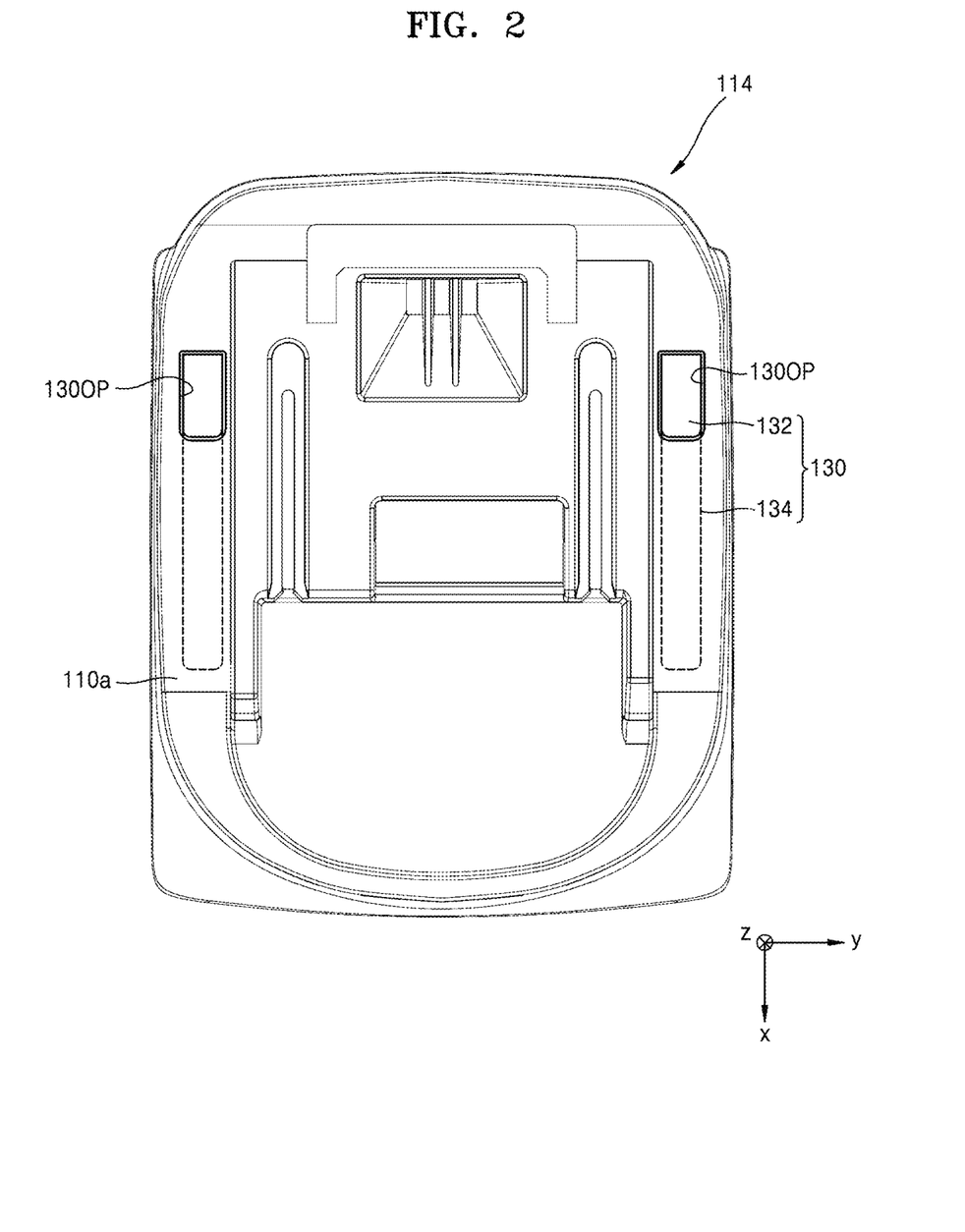
FIG. 2 is a schematic plan view separately illustrating a portion of a housing of the battery pack according to an embodiment of the present disclosure.
Figure 3:
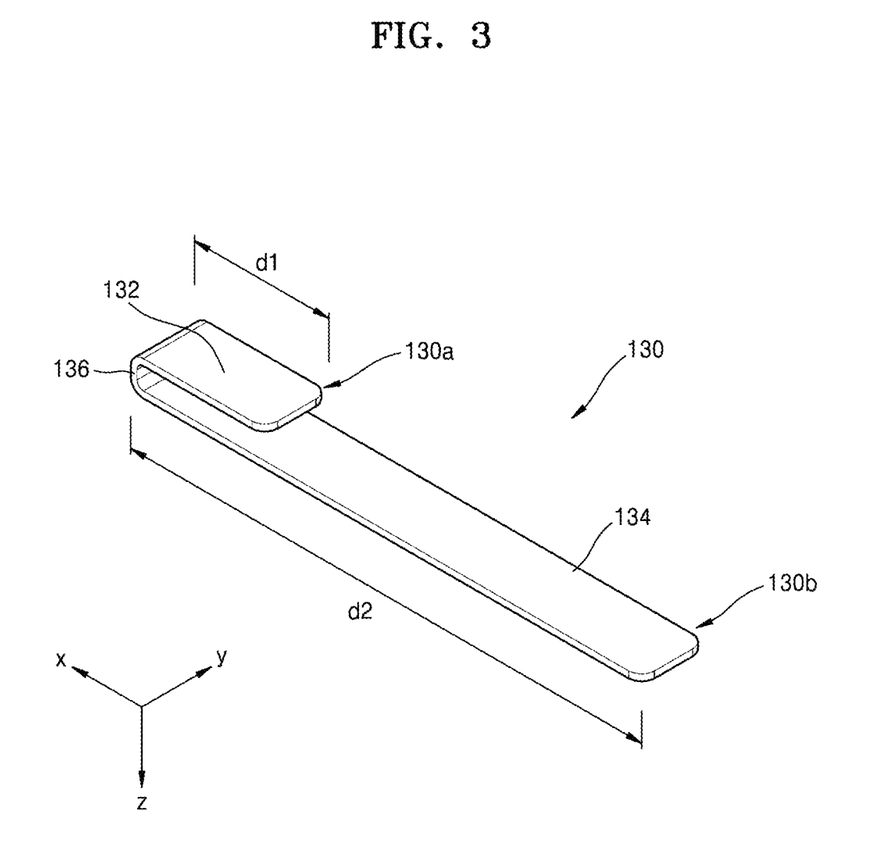
FIG. 3 is a perspective view schematically illustrating a heat transfer portion of the battery pack according to an embodiment of the present disclosure.

FIG. 2 is a schematic plan view illustrating a portion of the battery pack 100 according to an embodiment of the present disclosure, and FIG. 3 is a perspective view illustrating a portion of the battery pack 100 according to an embodiment of the present disclosure. FIG. 2 is a view corresponding to the lower housing 114, and FIG. 3 is a view corresponding to a heat transfer portion 130.

Referring to FIG. 2, the lower housing 114 may include the heat transfer portions 130. The heat transfer portions 130 may be arranged on a first surface 110a of the lower housing 114. In this case, the expression "the heat transfer portions 130 are arranged on the first surface 110a" refers to not only the case in which the heat transfer portions 130 are arranged on the first surface 110a, but also the case in which the heat transfer portions 130 are inserted through the first surface 110a by an insert injection molding method.

In FIG. 2, a pair of heat transfer portions 130 are symmetrically arranged, but the positions and number of heat transfer portions 130 may be varied according to the shape of a charging unit 200 (refer to FIG. 4) to be described later. In FIG. 2, the heat transfer portions 130 extend in a first direction (x-axis direction), and are respectively arranged on one side and the other side of the periphery of a central portion on which the battery pack 100 is mounted.

The heat transfer portions 130 may be located on one side of the housing 110, and at least portions of the heat transfer portions 130 may be exposed to the outside. It may be understood that at least portions of the heat transfer portions 130 are exposed to the outside to transfer heat from an outside heat source to the inside of the housing 110. Therefore, sides of the heat transfer portions 130 may be exposed to the outside of the housing 110, and the other sides of the heat transfer portions 130 may be located inside the housing 110.

Referring to FIG. 3, each of the heat transfer portions 130 may be bent in an asymmetric U-shape having a relatively long side. Each of the heat transfer portions 130 may include: a first extension portion 132 on a side 130a of a bent portion 136; and a second extension portion 134 on the other side 130b of the bent portion 136. The bent portion 136, the first extension portion 132, and the second extension portion 134 of the heat transfer portion 130 may be formed in one piece and may be understood as being separately defined for ease of description.

The heat transfer portions 130 may be formed of a material having thermal conductivity, such as a metallic material, and may include, for example, a nickel alloy or a copper alloy having high thermal conductivity. In addition, the heat transfer portions 130 may be inserted into the housing 110 by an insert injection molding method.

As illustrated FIG. 2, the first extension portion 132 of each of the heat transfer portions 130 may be exposed to the outside through an opening 1300P formed in the lower housing 114. Depending on the size of the opening 1300P formed in the lower housing 114, the first extension portion 132 may be entirely or partially exposed. The first extension portion 132 exposed to the outside is a portion for direct contact with an outside heat source, and the area of the first extension portion 132 exposed to the outside is determined by considering various factors such as the temperature of the outside heat source and the size of the battery pack 100.

The bent portion 136 and the second extension portion 134 of each of the heat transfer portions 130 may be located inside the housing. In FIG. 3, the bent portion 136 is bent such that the first extension portion 132 and the second extension portion 134 may be parallel to each other, but the present disclosure is not limited thereto. In other embodiments, a plurality of bent portions 136 may be provided.

As illustrated in FIG. 3, the length d2 (or surface area) of the second extension 134 may be greater than the length d1 (or surface area) of the first extension 132. As described above, heat transferred from the outside heat source to the first extension 132 is transferred to the second extension 134 by conduction. As a result, the inside temperature of the housing 110 is increased by the second extension 134 located inside the housing 110, and thus the second extension 134 should have a sufficient surface area to easily increase the inside temperature of the housing 110.

Figure 4:
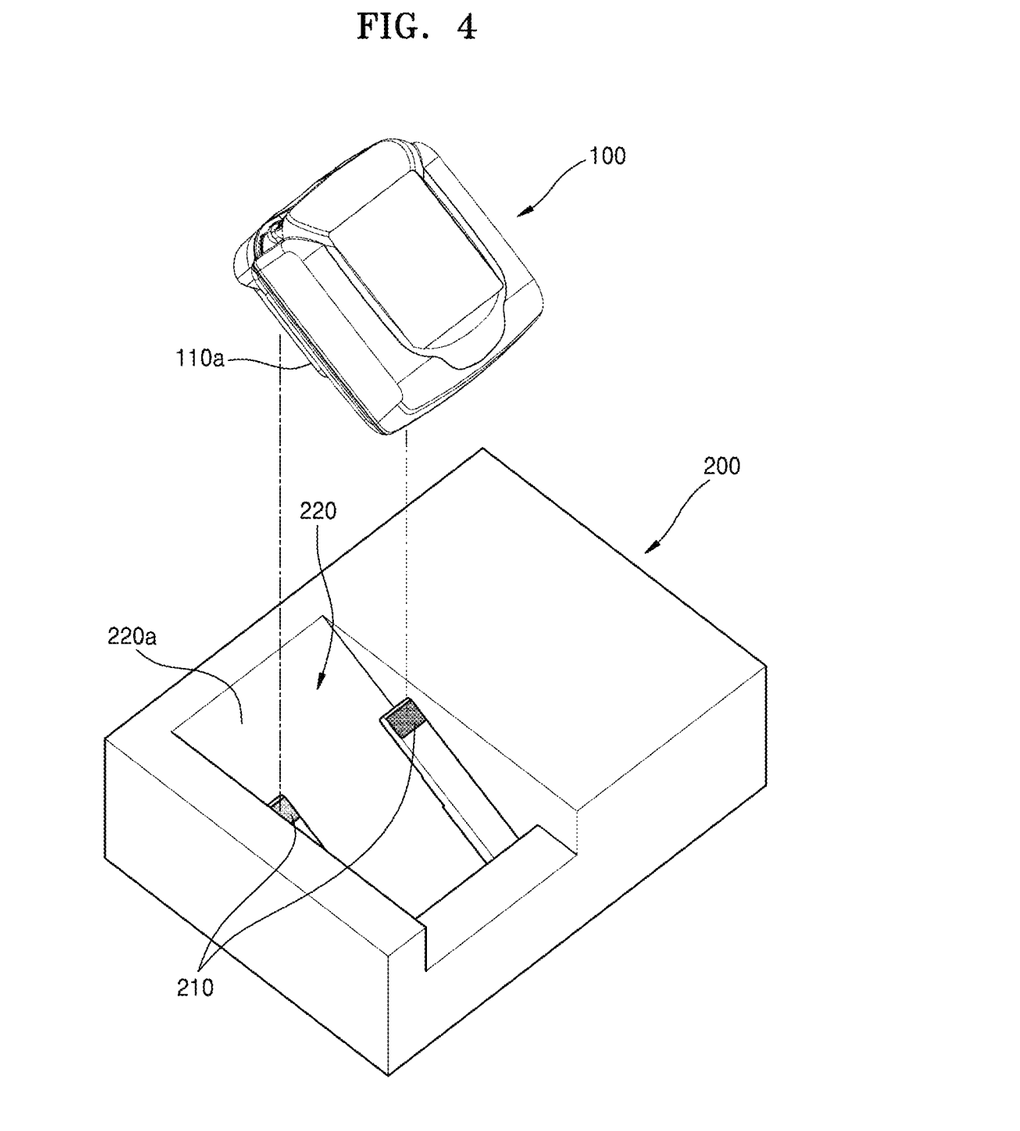
FIG. 4 is an exploded perspective view schematically illustrating an electronic device including the battery pack according to an embodiment of the present disclosure.

FIG. 4 is an exploded perspective view schematically illustrating an electronic device including a battery pack 100 according to an embodiment of the present disclosure.

Referring to FIG. 4, according to an embodiment of the present disclosure, the electronic device includes the battery pack 100 and a charging unit 200 for charging the battery pack 100. The battery pack 100 has the same structure as the battery pack 100 described above with reference to FIGS. 1 to 3. The battery pack 100 includes a housing 110 having a first surface 110a and forming the exterior of the battery pack 100, a battery unit 120 accommodated in the housing 110, and heat transfer portions 130 arranged on the first surface 110a of the housing 110 and at least partially exposed to the outside.

The charging unit 200 charges the battery pack 100 by receiving power from the outside, and may include a charging recess 220 in which the battery pack 100 is placed for charging. A second surface 220a is provided at the charging recess 220, and while the battery pack 100 is charged, the second surface 220a may face the first surface 110a of the housing 110. The charging recess 220 and the second surface 220a may be inclined with respect to an x-y plane corresponding to the ground. Owing to this structure for easily coupling the battery pack 100 to a charger, the battery pack 100 may be coupled to the charging recess 220 by sliding the battery pack 100 along the inclined second surface 220a.

The charging unit 200 is provided with heat supply portions 210 that supply heat to the battery unit 120. The heat supply portions 210 may be arranged on the second surface 220a on which the charging recess 220 of the charging unit 200 is formed, and may be brought into direct contact with the heat transfer portions 130 of the battery pack 100. Referring to FIGS. 1 to 3 together, the heat supply portions 210 supply heat to the heat transfer portions 130 by making direct contact with first extension portions 132 of the heat transfer portions 130, and the heat transfer portions 130 which are heated may increase the temperature of internal air of the housing.

Figure 5:
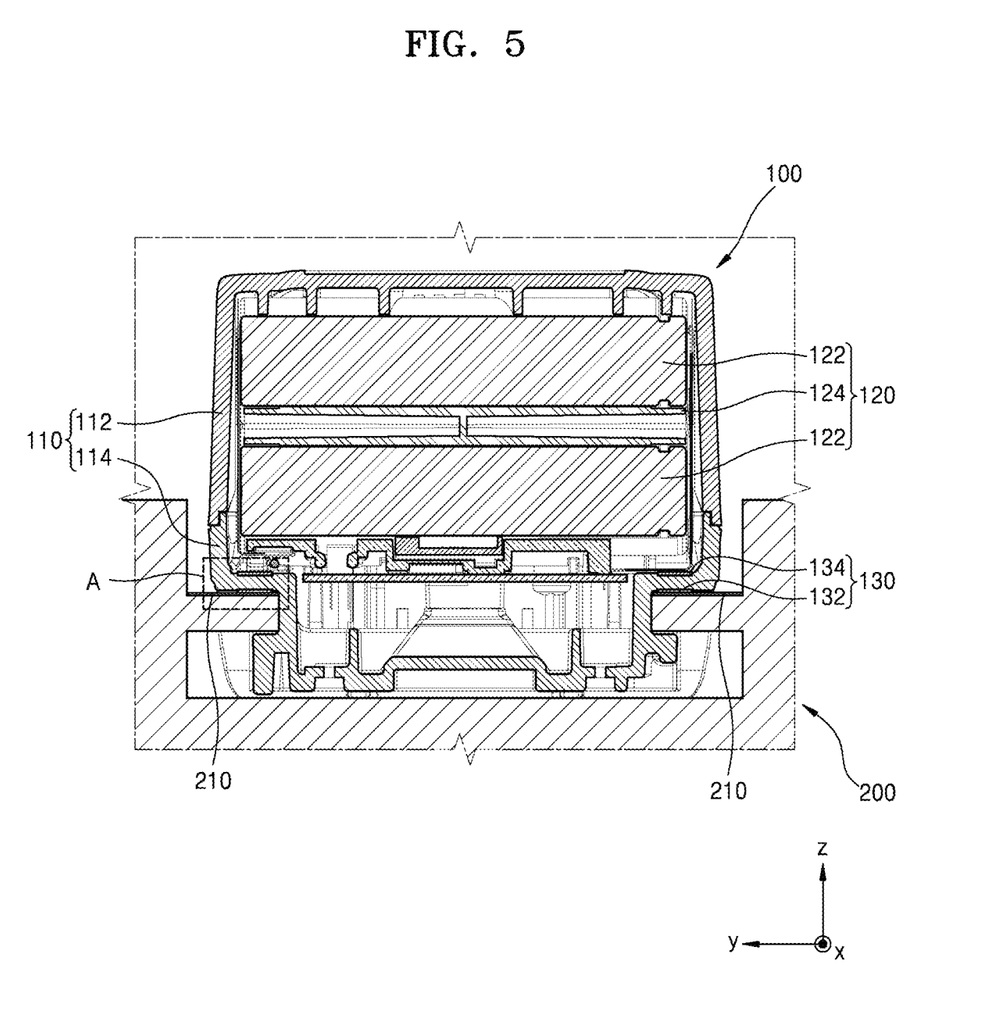
FIG. 5 is a cross-sectional view schematically illustrating the electronic device including the battery pack according to an embodiment of the present disclosure.
Figure 6:
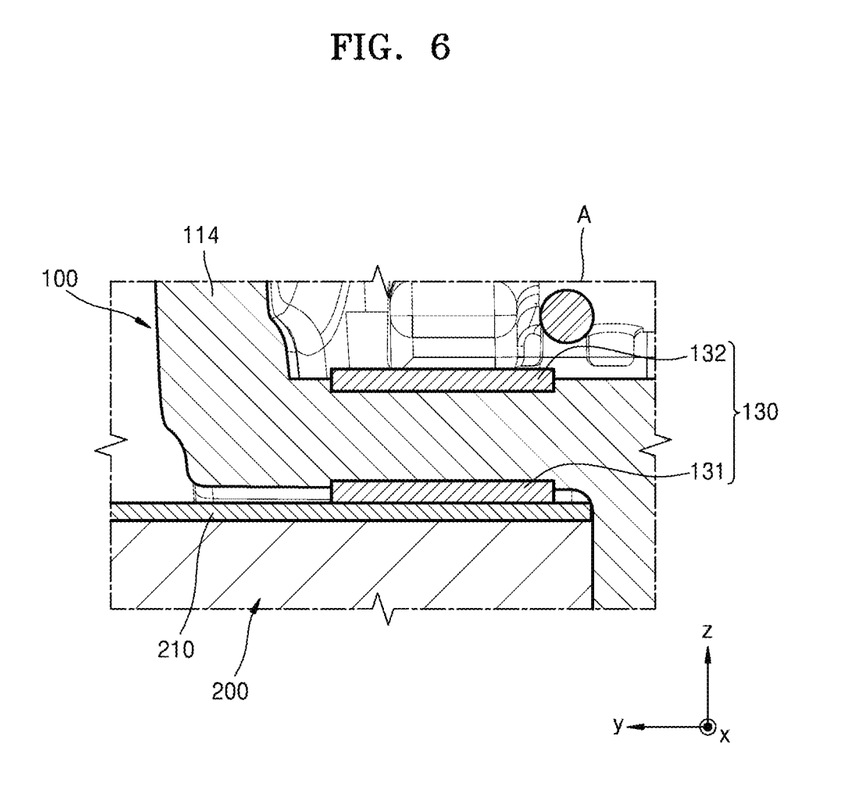
FIG. 6 is an enlarged cross-sectional view schematically illustrating a portion of the electronic device including the battery pack according to an embodiment of the present disclosure.

FIG. 5 is a cross-sectional view schematically illustrating the electronic device including the battery pack 100 according to an embodiment of the present disclosure, and FIG. 6 is an enlarged cross-sectional view schematically illustrating a portion of the electronic device including the battery pack 100 according to an embodiment of the present disclosure.

FIG. 5 is a cross-sectional view illustrating a coupling structure between the battery pack 100 and the charging unit 200 of the electronic device according to an embodiment of the present disclosure, and FIG. 6 is a view corresponding to a portion A in FIG. 5.

Referring to FIGS. 5 and 6, the heat supply portions 210 of the charging unit 200 may be brought into direct contact with the heat transfer portions 130 of the battery pack 100. Each of the heat transfer portions 130 of the battery pack 100 may include a first extension portion 132 on one side of a bent portion 136 and a second extension portion 134 on the other side of the bent portion 136. In this case, the first extension portions 132 may be exposed to the outside of the housing 110, and the exposed first extension portions 132 may be brought into direct contact with the heat supply portions 210 of the charging unit 200. The heat supply portions 210 and the first extension portions 132 may generally have a plate shape, and may be configured to be in surface contact with each other. It may be understood that when the heat supply portions 210 and the first extension portions 132 make contact with each other through a large contact area, it is advantageous in terms of heat conduction.

Referring to FIG. 4 together, heat transferred to the first extension portions 132 which are in contact with the heat supply portions 210 may be conducted along the bent portions 136 and the second extension portions 134. The second extension portions 134 may be provided to have a suitable surface area by considering the inside space of the battery pack 100 for increasing the temperature of the internal air of the battery pack 100. The heat conducted to the second extensions 134 starts to increase the temperature of air around the second extension portions 134 through convection of air inside the battery pack 100. Air heated as described above rises by convection to an upper region of the battery pack 100, and upper cold air moves down to a lower region of the battery pack 100 in which the second extension portions 134 are located. After the internal air temperature of the battery pack 100 rises by convection as described above, the charging unit 200 may start to charge the battery pack 100.

When the battery pack 100 is designed for power tools of the related art, due to the characteristics of the power tools which are usually used outdoor, it is important to design the battery pack 100 to withstand a temperature difference from the outside. In particular, when the battery pack 100, which are used while being repeatedly charged and discharged, is charged using a charger at a subzero temperature, the battery pack 100 may not be easily charged because the temperature of the battery pack 100 is low due to the outside temperature.

In this situation, a user of a power tool may place the battery pack 100 beside a fire such as a stove to increase the temperature of the battery pack 100, but this may excessively increase the temperature of the battery pack 100 sensitive to high temperatures and may thus cause explosion of the battery pack 100 or damage to the battery pack 100.

Therefore, according to an embodiment of the present disclosure, the electronic device including the battery pack 100 is provided with: the heat transfer portions 130 which are at least partially exposed on the housing 110; and the heat supply portions 210 of the charging unit 200 to supply heat to the heat transfer portions 130, such that the battery pack 100 may be easily charged regardless of the outside temperature.

In addition, according to an embodiment of the present disclosure, the electronic device including the battery pack 100 is configured to increase the temperature of the battery pack 100 by using a charger (charging unit 200) without using an additional device such that the safety of the battery pack 100 may be securely guaranteed. Since heat is directly transferred from the charger (charging unit 200) to the battery pack 100, the charger may increase the temperature of the battery pack 100 to a level required to start charging of the battery pack 100 without using another heat supply.

Figure 7A:
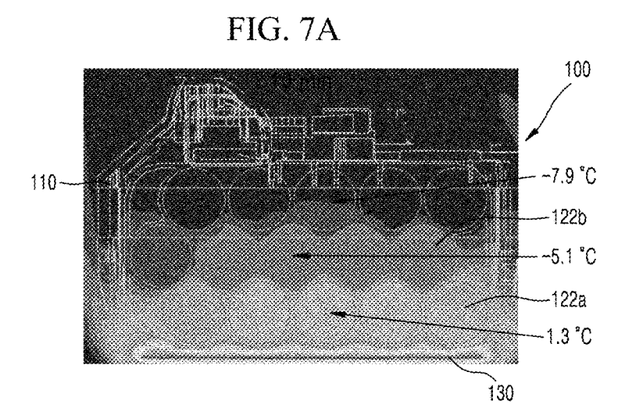
FIGS. 7A to 7C are views illustrating results of a thermal analysis simulation performed on the battery pack according to an embodiment of the present disclosure.
Figure 7B:
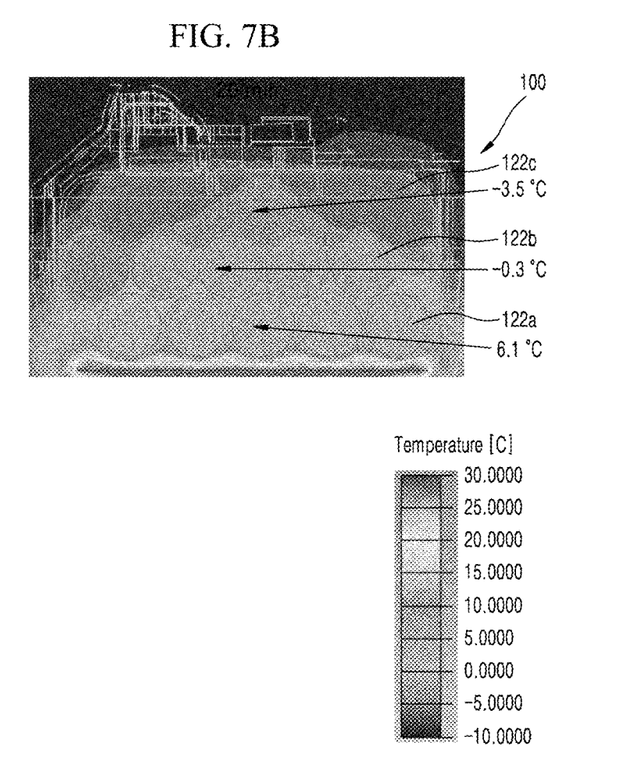
Figure 7C:
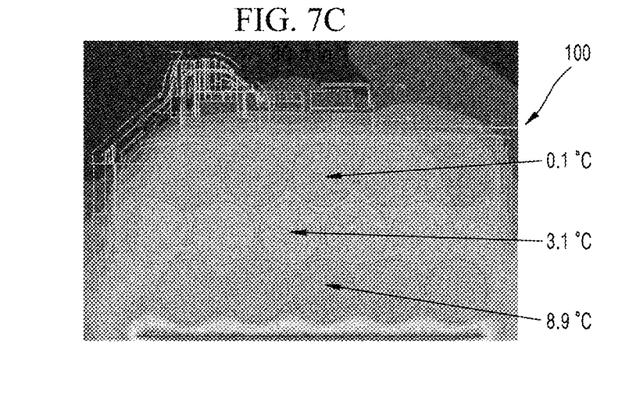

FIGS. 7A to 7C are views illustrating results of a thermal analysis simulation performed on the battery pack 100 according to an embodiment of the present disclosure.

Referring to FIGS. 7A to 7C, the battery pack 100 may include the heat transfer portions 130 in a lower region of the housing 110. In the experiment, the area of the heat transfer portions was 100*65 mm, and it was assumed that the temperature of the heat supply portions (not shown) was uniform at 30° C., and the ambient temperature was −10° C. In the situation in which the ambient temperature was −10° C., the inside temperature of the battery pack 100 placed outdoor for a long time was close to −10° C.

FIG. 7A is a heat analysis graph obtained after the heat supply portions (not shown) had supplied heat for 10 minutes. It could be seen that the temperature of the battery pack 100 gradually increased from a lower region of the battery pack 100 after heat had been supplied for 10 minutes. The temperature around bare cells 122a of the battery pack 100 of the embodiment which form a first layer rose up to 1.3° C. The temperature around bare cells 122b forming a second layer also rose up to −5.1° C.

FIG. 7B is a heat analysis graph obtained after the heat supply portions (not shown) had supplied heat for 20 minutes. It could be seen that the inside temperature of the battery pack 100 gradually increased after heat had been supplied for 20 minutes. The temperature around the bare cells 122a of the battery pack 100 which form the first layer rose up to 6.1° C. The temperature around the bare cells 122b forming the second layer also rose up to −0.3° C., and the temperature around bare cells 122c forming a third layer farthest from a heat source also rose up to −3.5° C.

FIG. 7C is a heat analysis graph obtained after the heat supply portions (not shown) had supplied heat for 30 minutes. It could be seen that the inside temperature of the battery pack 100 entirely increased above 0° C. after heat had been supplied for 30 minutes. Since air is also present inside the battery pack 100, when heat was supplied from a surface of the battery pack 100, for example, from a lower region of the battery pack 100, the entire temperature of the inside of the battery pack 100 was increased to 0° C. or higher through convection of air in the battery pack 100.

The present disclosure has been described with reference to the embodiments shown in the accompanying drawings for illustrative purposes only, and it will be understood by those of ordinary skill in the art that various modifications and equivalent other embodiments may be made therefrom. Therefore, the scope and spirit of the present disclosure should be defined by the following claims.

The invention claimed is:

1. A battery pack comprising:
a housing which comprises a first surface comprising an opening and forms an exterior of the battery pack;
a battery unit which is accommodated in the housing; and
a heat transfer portion which is arranged on the first surface of the housing and is at least partially exposed to outside of the housing through the opening, the heat transfer portion increasing an inside temperature of the housing by receiving heat from the outside,
wherein:
the heat transfer portion includes a bent portion, a first extension portion on a side of the bent portion, and a second extension portion on another side of the bent portion,
the first extension portion is exposed to the outside of the housing through the opening, and
a surface area of the second extension portion is greater than a surface area of the first extension portion.

2. The battery pack of claim 1, wherein the bent portion and the second extension portion are located inside the housing.

3. The battery pack of claim 1, wherein heat transferred to the first extension portion is conducted through the bent portion and the second extension portion to increase the inside temperature of the housing.

4. The battery pack of claim 1, wherein the heat transfer portion comprises a metallic material.

5. The battery pack of claim 1, wherein the heat transfer portion comprises a nickel alloy or a copper alloy.

6. The battery pack of claim 1, wherein the heat transfer portion is inserted into the housing by an insert injection molding method.

7. An electronic device comprising:
a battery pack which comprises a housing having a first surface and forming an exterior of the battery pack, a battery unit accommodated in the housing, and a heat transfer portion arranged on the first surface of the housing and at least partially exposed to outside of the housing; and
a charging unit which is configured to charge the battery pack by receiving power from outside of the charging unit, the charging unit comprising a second surface which faces the first surface of the housing and a heat supply portion which is arranged on the second surface and is at least partially exposed to the outside of the charging unit,
wherein:
the heat transfer portion includes a bent portion, a first extension portion on a side of the bent portion, and a second extension portion on another side of the bent portion, and
a surface area of the second extension portion is greater than a surface area of the first extension portion.

8. The electronic device of claim 7, wherein the heat supply portion is configured to be in direct contact with the heat transfer portion.

9. The electronic device of claim 7, wherein heat supplied from the heat supply portion is transferred to the heat transfer portion to increase an inside temperature of the housing.

10. The electronic device of claim 7, wherein the first extension portion is exposed to the outside of the housing.

11. The electronic device of claim 7, wherein the first extension portion is configured to be in direct contact with the heat supply portion.

12. The electronic device of claim 7, wherein the second extension portion and the bent portion are located inside the housing.

13. The electronic device of claim 7, wherein the heat transfer portion comprises a metallic material.

14. The electronic device of claim 7, wherein the heat transfer portion comprises a nickel alloy or a copper alloy.

15. The electronic device of claim 7, wherein the heat transfer portion is inserted into the housing by an insert injection molding method.

* * * * *